March 5, 1946.　　　　M. WARE　　　　2,395,948
INTERNAL-COMBUSTION ENGINE
Filed Dec. 11, 1939
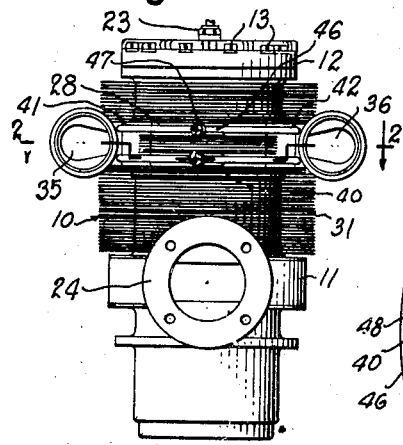
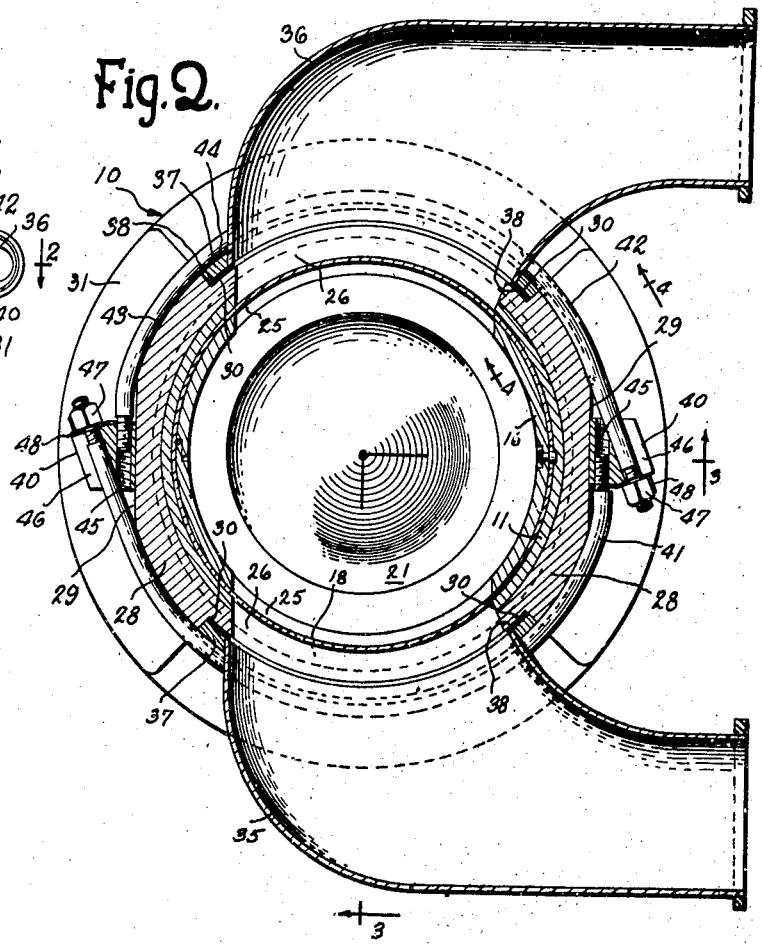
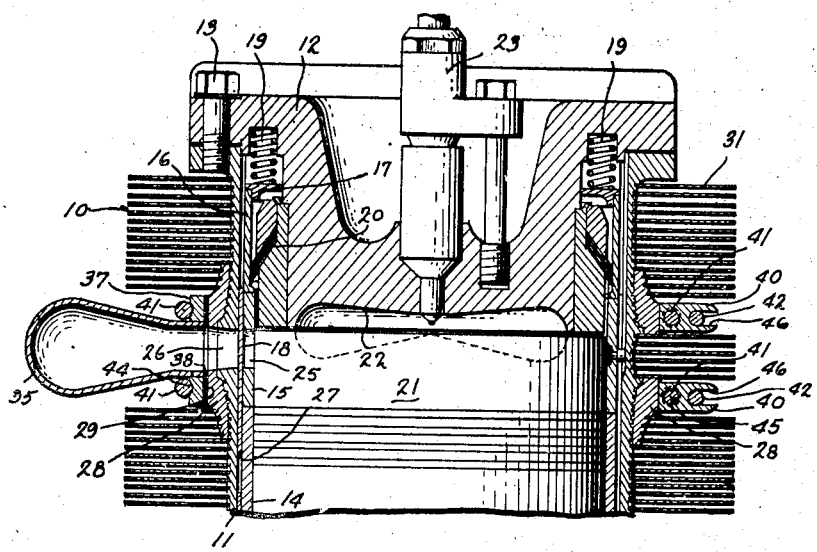
INVENTOR.
Marsden Ware
BY
Tibbetts & Hart
ATTORNEYS Patented Mar. 5, 1946

2,395,948

UNITED STATES PATENT OFFICE 2,395,948

INTERNAL-COMBUSTION ENGINE

Marsden Ware, Huntington Woods, Mich., assignor to Packard Motor Car Company, Detroit, Mich., a corporation of Michigan Application December 11, 1939, Serial No. 308,603

3 Claims. (Cl. 285—108)

This invention relates to internal combustion engines and more particularly to exhaust manifold structure.

Minimum weight and simplicity are two factors in the design of many internal combustion engines that are of major importance and in this connection exhaust manifolding has a part. In some engines, particularly the sleeve type, the exhaust manifold structure must be connected in leak-proof relation to the cylinder. Forming exhaust manifold elbows integral with the cylinders results in difficult and expensive casting and machining operations. Bolting and welding separately formed and machined exhaust elbows to the cylinders increases engine weight because the elbows must have a relatively large flanged surface to receive bolts or for a welding operation, and the machining operations on the flange bearing surface must be carefully done to provide leak-proof mating with the cylinder.

An object of the present invention is to provide a device for securing an exhaust manifold structure to a cylinder structure that is of simple design and minimum weight.

Another object of the invention is to provide a device for securing an exhaust manifold structure to a cylinder that can be readily applied and removed.

Still another object of the invention is to provide a device for securing dual exhaust manifold structure to a cylinder that can be economically formed and applied.

Other objects of the invention will appear from the following description taken in connection with the drawing, which forms a part of the specification, and in which:

Fig. 1 is an elevational view of an internal combustion engine cylinder structure having the invention associated therewith;

Fig. 2 is an enlarged sectional view through the cylinder structure taken on line 2—2 of Fig. 1;

Fig. 3 is another sectional view of the cylinder structure taken on line 3—3 of Fig. 2;

Fig. 4 is a fragmentary sectional view of the cylinder structure taken on line 4—4 of Fig. 2.

In the drawing, the numeral 10 designates generally the cylinder structure of a sleeve-valve type of internal combustion engine. In the cylinder structure disclosed there is an outer cast wall 11 having a head 12 secured thereon by bolts 13. Within the outer cylinder wall is an inner cylinder wall comprised of aligned sections 14, 15, 16 and 17, and between the inner and outer cylinder walls is arranged a sleeve valve 18 adapted to be operated in any conventional manner. The inner wall structure is seated at its base against a flange projected inwardly from the outer cylinder (not shown) and is held in such seated relation by coil springs 19 bearing against the head 12 and the top of the wall section 17. The head projects through the inner wall sections 16 and 17 and into the section 15 and is in spaced relation therewith. Between the inner wall section 16 and the head is a suitable sealing device 20.

The inner cylinder wall structure receives the piston 21 and between the piston and the head is a combustion space 22. Suitably attached to the head and projecting into the combustion chamber is arranged a conventional injection device 23 for feeding fuel into the inner wall structure. Air is fed into the inner wall structure through a suitable manifold 24.

The inner wall section 15 is provided with a pair of oppositely disposed exhaust ports 25 and aligned with such ports is another pair of exhaust ports 26 extending through the outer cylinder wall. The sleeve valve 18 is formed with a pair of ports, as indicated at 27, arranged to align with ports 25 and 26 in the cylinder walls during a certain period of the engine cycle to allow exhaust gas to escape from the combustion chamber.

The outer cylinder has pairs of oppositely disposed bearing members 28 fixed thereto and arranged intermediate the pair of exhaust ports 26. These bearing members are each formed with a flat outer face portion 29 and are recessed to form seats 30 surrounding the ports 26. The outer cylinder wall and portions of the bearing members have suitable cooling fins 31 affixed thereto.

Associated with the outlet ports of the cylinder structure is exhaust manifold means consisting of a pair of outlet elbows 35 and 36. These elbows are detachably secured to the bearing members in communication one with each of the ports 26. To the ends of the elbows adjacent the cylinder is affixed a flange 37 that surrounds the same and serves to locate the elbows against the seats 30 in the bearing members. Between the flanges and the seats of the bearing means 28 are provided sealing gaskets 38.

The securing means for the exhaust manifold elbows comprises a pair of hoop type securing devices of a nature such that the elbows can be quickly attached to or removed from the cylinder structure and also so that an extensive bearing flange surface around the bearing end of the elbows is not required. Each securing device includes a pair of anchor members, preferably in the form of blocks 40, seated diametrically one on each of the flat surfaces 29 of the bearing members 28 and having associated therewith clamping means in the form of similar but oppositely disposed semi-circular tie rods 41 and 42 that embrace portions of the cylinder and the flanges of the exhaust manifold elbows. The devices are spaced so that the clamping means engage the elbow, flanges above and below the elbows and the bearing means 28 and flanges 37 are formed respectively with peripheral grooves 43 and 44 for receiving the tie rods 41 and 42. The anchor blocks are formed with threaded openings 45 adjacent their base and the tie rods are threaded at one end and screwed into such openings, such fixed ends of tie rods in each device being screwed into the opening in the opposite anchor block.

The anchor blocks are also each formed with a slot 46 in an outer wall that extends substantially tangent to the groove 43 in the adjacent bearing means when applied. The unsecured ends of the tie rods can be sprung into and out of the slots 46 in the anchor block opposite that to which they are secured. These free end portions of the tie rods, adapted to lie in the anchor block slots, are threaded and project beyond the blocks for the reception of nuts 47. These nuts are screwed on the tie rods into a pressure relation with the anchor blocks to place the tie rods in tension and thereby securely clamp the flanged bearing ends of the exhaust elbows tightly against the seats in the bearing members around the exhaust ports 26. Due to the angle of the slots in the anchor blocks, the nuts when screwed down to place the tie rods in tension will retain the tie rods securely to the anchor blocks. In order to prevent the nuts from turning when in desired adjusted position, suitable lock washers 48 are utilized. Each securing device consists of two similar assembled sections each including an anchor block, a tie rod and a nut.

Before applying the manifold elbows to the cylinder, the sections of the securing devices are each assembled by screwing a tie rod into the threaded opening 45 of an anchor block and applying a nut to the free end of the rod. The flanged ends 37 of the manifold elbows are then held against the gaskets 29 in the seat portions 30 of the bearing members and the sections of the devices are moved toward each other until the rods rest in the grooves 43 and 44 and the anchor blocks seat on the flat surfaces 29 of the bearing members. The free ends of the tie rods are then flexed into the slots 46 in the opposite anchor block from that to which they are fixed and nuts 47 are screwed down on the rods against the blocks thereby placing the tie rods of each device in desired tension and securing them to the blocks. In this manner the elbows will be tightly clamped to the cylinder. By backing off the nuts from the anchor blocks and flexing the tie rods out of the slots in the anchor blocks, the securing devices can be moved radially of the cylinder in separate assembled sections so that the manifold elbows can be readily detached from the cylinder.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. A hoop device for clamping base flanges of a pair of manifolds diametrically to a cylinder structure comprising two similar assembled sections each composed of an anchor block having an abutment wall, a tie rod of substantially semi-circular form and having one end fixed to the block, and adjustable pressure means on the free end of the rod, said blocks embracing the cylinder structure diametrically between the base flanges of the manifolds and the rods embracing different base flanges and portions of the cylinder structure when applied, the free end of each rod projecting beyond the abutment wall of the block opposite that to which it is fixed and the pressure means being adjusted on the projecting ends of the rods to engage the abutment walls to apply the device.

2. A hoop device for clamping the base flanges of a pair of manifolds diametrically to a cylinder structure comprising two similar assembled sections each composed of an anchor block, a threaded tie rod of semi-circular form having one end fixed to the block, and a nut screwed on the other free end of the rod, said blocks embracing the cylinder structure diametrically between the base flanges of the manifolds and the rods embracing different base flanges of the manifolds and portions of the cylinder structure when applied, the free ends of said rods being detachably connected to the block opposite that to which they are fixed by adjusting the nuts thereon to engage such blocks, said assembled sections being movable radially to or from the cylinder structure when the nuts are released from engagement with the blocks.

3. A hoop device for clamping the base flanges of a pair of diametric manifolds to a cylinder structure comprising two similar assembled sections each composed of an anchor block having a slotted wall, a substantially semicircular flexible tie rod, and a nut screwed on the free end of the tie rod, said sections being radially movable in opposite directions when applying to or removing from the cylinder structure and arranged so that the blocks will embrace the cylinder structure diametrically and between the base flanges of the manifolds and the tie rods will embrace different base flanges, the free ends of the rods nesting in the slot in the wall of the block opposite that to which they are fixed and extending beyond such block when assembled and the nuts being turned down to engage the blocks when securing the sections together.

MARSDEN WARE.